US010230131B2

(12) United States Patent
Voitl et al.

(10) Patent No.: US 10,230,131 B2
(45) Date of Patent: Mar. 12, 2019

(54) METHOD FOR PRODUCING A DEHYDRATED LIQUID ORGANIC CARBONATE MIXTURE

(71) Applicant: Gotion, Inc., Fremont, CA (US)

(72) Inventors: Agnes Voitl, Schifferstadt (DE); Itamar Michael Malkowsky, Speyer (DE); Axel Kirste, Limburgerhof (DE)

(73) Assignee: Gotion Inc., Fremont, CA (US)

(*) Notice: Subject to any disclaimer, the term of this patent is extended or adjusted under 35 U.S.C. 154(b) by 227 days.

(21) Appl. No.: 14/903,101

(22) PCT Filed: Jul. 10, 2014

(86) PCT No.: PCT/EP2014/064807
§ 371 (c)(1),
(2) Date: Jan. 6, 2016

(87) PCT Pub. No.: WO2015/004233

PCT Pub. Date: Jan. 15, 2015

(65) Prior Publication Data

US 2016/0218391 A1    Jul. 28, 2016

(30) Foreign Application Priority Data

Jul. 11, 2013 (EP) ..................... 13176173

(51) Int. Cl.
*B01J 20/00* (2006.01)
*H01M 10/0566* (2010.01)
(Continued)

(52) U.S. Cl.
CPC ....... *H01M 10/0566* (2013.01); *B01J 20/186* (2013.01); *B01J 20/3408* (2013.01);
(Continued)

(58) Field of Classification Search
CPC .......... H01M 10/0566; H01M 10/0525; B01J 20/186; B01J 20/3408; B01J 2220/606
See application file for complete search history.

(56) References Cited

U.S. PATENT DOCUMENTS

2004/0161671 A1* 8/2004 Merritt .................. A61N 1/375
429/326
2005/0095506 A1* 5/2005 Klaassen ............. H01M 2/1646
429/322
(Continued)

FOREIGN PATENT DOCUMENTS

CN       1338789 A      3/2002
CN    101 894974 A     11/2010
(Continued)

OTHER PUBLICATIONS

International Search Report dated Oct. 29, 2014 in PCT/EP2014/064807.

*Primary Examiner* — Cynthia H Kelly
*Assistant Examiner* — Monique M Wills
(74) *Attorney, Agent, or Firm* — Young Basile Hanlon & MacFarlane, P.C.

(57) ABSTRACT

The present invention relates in a first aspect to a method for producing in the interior of a production equipment a dehydrated liquid mixture for use as a solvent for a conducting salt (e.g. $LiPF_6$) wherein after cleaning the equipment with isopropyl alcohol and providing or preparing a liquid starting mixture in said interior of the production equipment both the isopropyl alcohol content in the mixture and the water content in the mixture is reduced by interaction with a zeolite molecular sieve.

21 Claims, 4 Drawing Sheets

(51) Int. Cl.
  *H01M 10/052* (2010.01)
  *B01J 20/18* (2006.01)
  *B01J 20/34* (2006.01)
  *H01M 10/0525* (2010.01)

(52) U.S. Cl.
  CPC ..... *H01M 10/052* (2013.01); *H01M 10/0525* (2013.01); *B01J 2220/606* (2013.01)

(56) References Cited

U.S. PATENT DOCUMENTS

| | | | |
|---|---|---|---|
| 2012/0035317 A1* | 2/2012 | Roberts | C08G 18/0823 524/591 |
| 2012/0141868 A1 | 6/2012 | Hirano | |
| 2013/0090394 A1* | 4/2013 | Husain | B01J 8/067 518/711 |

FOREIGN PATENT DOCUMENTS

| | | | | |
|---|---|---|---|---|
| EP | 1 836 746 B1 | | 9/2009 | |
| JP | 2002-001107 | * | 1/2002 | ............. H01M 8/00 |
| JP | 2007-165294 A | | 6/2007 | |

* cited by examiner

METHOD FOR PRODUCING A DEHYDRATED LIQUID ORGANIC CARBONATE MIXTURE

The present invention relates in a first aspect to a method for producing in the interior of a production equipment a dehydrated liquid mixture for use as a solvent for a conducting salt (e.g. $LiPF_6$) wherein after cleaning the equipment with isopropyl alcohol and providing or preparing a liquid starting mixture in said interior of the production equipment both the isopropyl alcohol content in the mixture and the water content in the mixture is reduced by interaction with a zeolite molecular sieve.

According to a second aspect, the present invention relates to a method of producing an electrolyte mixture.

Dehydrated liquid mixtures for use as a solvent for conducting salts comprising water in very low amounts are for example needed in lithium ion batteries.

In lithium ion batteries an electrolyte mixture is present which comprises a conducting lithium salt and a dehydrated liquid solvent mixture, wherein the conducting salt is dissolved in the dehydrated liquid solvent mixture. Such solvents in the dehydrated liquid solvent mixture are usually organic carbonates (e.g. ethylene carbonate (EC), ethyl methyl carbonate (EMC), propylene carbonate (PC)). These organic carbonates are usually only commercially available exhibiting an initial water content typically in the range of from 100 to 1000 ppm.

However, the presence of water in lithium ion batteries usually causes undesired effects. When water is present in the electrolyte mixture of a lithium ion battery, not only the negative electrode performance of the battery is reduced but also decomposition of the conducting salt in the electrolyte mixture is accelerated. Although various conducting salts are known, lithium hexafluorophosphat ($LiPF_6$) is widely used in lithium ion batteries.

Neumann (Chemie Ingenieur Technik, 2011, 83, No. 11, 2042-2050) provides a general overview article regarding lithium ion secondary batteries. The document discloses that lithium hexafluorophosphat ($LiPF_6$) requires the absence of water. The reason is that $LiPF_6$ easily decomposes in the presence of water and forms hydrofluoric acid (HF) which causes massive corrosion in the battery. However, Neumann does not disclose any method to reduce the water content in a liquid mixture comprising one or more organic carbonates in order to avoid formation of hydrofluoric acid.

It is generally accepted that the amount of water in the electrolyte mixture of lithium ion batteries needs to be 50 ppm or less to minimize the aforementioned effects. Therefore, removal of water from the electrolyte mixture or the liquid mixture meant as a solvent for the lithium conducting salt by a dehydration (removal of water) step is in many cases a significant step.

Examples of dehydration (i.e. removal of water) methods include (i) a method of separately drying a liquid solvent mixture (to obtain a dehydrated liquid solvent mixture) and a conducting salt and then mixing both to prepare an electrolyte mixture or (ii) a method of drying a mixture of a liquid solvent mixture and a conducting salt. The removal of water is for example conducted by using a desiccant, such as a zeolite molecular sieve, and/or by distillation.

For example, document Pahl et al. (Chemie Ingenieur Technik, 2010, 82, No. 5, 634-640) relates to the adsorptive removal of water from primary alcohols by means of zeolites. The document discloses that water can be efficiently removed (down to a low ppm range) by adsorption at molecular sieves such as zeolites of type 3A or 4A. However, document Pahl et al. is silent with respect to reducing the water content in a liquid mixture comprising one or more organic carbonates.

In this context it needs to be considered that usually an ion-exchangeable cation is present in a zeolite. If a zeolite is used for dehydrating a mixture of a liquid solvent mixture and a lithium conducting salt, the cation of the zeolite can cause an ion exchange reaction with the lithium ions during the dehydration process, contaminating the dehydrated electrolyte mixture.

Such ion exchange reactions can be avoided by drying method (i), wherein the liquid solvent mixture is separately dried (i.e. in the absence of a conducting salt) or by a specific type of method (ii) namely by applying a lithium zeolite molecular sieve, i.e. a zeolite wherein the original ion-exchangeable cation is ion-exchanged with lithium ions and therefore suited for drying in the presence of a lithium conducting salt.

US 2012/0141868 A1 discloses a lithium zeolite for treatment of nonaqueous electrolytic solutions and a treatment method of nonaqueous electrolytic solutions. The document discloses that on the basis of a method of type (i) the water amount can hardly be reduced to 50 ppm or less.

CN 1338789 A relates to a process for preparing organic carbonate solvents used for secondary lithium battery. The document discloses that a kind of organic carbonate solvents for secondary lithium battery is prepared by flowing organic carbonate through a drying column containing drying agent which may be for example molecular sieve for dewatering it, distilling in distillation tower at 50-200° C. and −0.05 to 0.1 MPa, and separating distillate. The document reports that the advantages are high purity up to 99.9% or more and low water content (lower than 5 ppm). However, the process is complicated as it includes both an adsorption and a distillation step.

Furthermore, drying methods of type (i) are often negatively affected by the zeolites used. In order to form mechanically stable shaped bodies (e.g. granules, pellets, etc.) the zeolite material (powder) is typically mixed with a binder to compensate for the low binding affinity of the zeolite powder particles (the powder is the synthesis product of synthetic zeolite production). Examples of binders typically used include silica, alumina and clay. Typical clays include kaolin-type, bentonite-type, talc-type, pyrophyllite-type, molysite-type, vermiculite-type, montmorillonite-type, chlorite-type and halloysite-type clays.

Such a binder is not particularly limited in its amount added but is often added in an amount of 10 to 50 parts by weight per 100 parts by weight of zeolite powder particles. If the amount of the binder added is less than 10 parts by weight per 100 parts by weight of zeolite powder particles, the mechanically stable shaped bodies may collapse during use, whereas if it exceeds 50 parts by weight, the dehydration capacity (i.e. drying capacity) becomes insufficient.

One problem is that such binders usually contain large quantities of releasable metal ions (e.g. aluminium ions), which could contaminate the mixture to be dried (metal leaching).

In order to reduce or avoid contamination of the mixture to be dehydrated by metal leaching, mechanically stable shaped bodies of binderless zeolites can be used. In order to form mechanically stable shaped bodies (e.g. granules, pellets, etc) from zeolite powder a binder is "used". After formation of mechanically stable shaped bodies the binder is converted into a zeolite during the process of forming mechanically stable shaped bodies (formation of a binderless zeolite molecular sieve) e.g. by caustic digestion. By such a conversion (also named zeolitisation), the proportion of zeolite contained in the mechanically stable shaped bodies can be increased and ultimately, the mechanically stable shaped bodies can be composed entirely of zeolite.

Schuhmann et al. (Chemie Ingenieur Technik 2011, 83, No. 12, 2237-2243) disclose binderless zeolite molecular sieves of the LTA- and FAU-type. However, the document does not disclose the use of binderless zeolite molecular sieves in order to reduce the water content to a very low amount of e.g. less than 20 ppm in a liquid mixture comprising one or more organic carbonates.

As mentioned above, the presence of water in an electrolyte mixture causes severe problems. This water typically enters the liquid solvent mixture together with the organic carbonates or other constituents. However, such a mixture is usually additionally contaminated with considerable amounts of water and other further organic solvents from the interior of the production equipment during the production process. In technical (large scale) production units this interior of the production equipment is usually cleaned in several cleaning steps prior to the production of a dehydrated liquid mixture in order to remove any kind of foreign substances and/or compounds that must not or should not be included in the product, i.e. the dehydrated (solvent) liquid mixture for use in or as electrolyte mixture. These cleaning steps usually comprise the steps of contacting the interior of the production equipment (i) with water and (ii) typically in a final cleaning step with a polar organic solvent such as isopropyl alcohol (throughout this text the term "isopropyl alcohol" indicates the chemical compound propan-2-ol). Isopropyl alcohol has a number of advantages: as a common solvent in chemical industry it is easily available, cheap, non-toxic, and has a low boiling point. As a special feature, isopropyl alcohol and water form an azeotropic mixture. As a consequence, residual amounts of water can be removed together with the isopropyl alcohol, which allows for a significant reduction of the water content in the interior of the production equipment. However, trace amounts of water and, in particular, isopropyl alcohol usually remain in the interior of the production equipment (in particular on the inner surfaces of the production equipment) even after careful removal of isopropyl alcohol. Thus, these trace amounts of water and isopropyl alcohol contribute to the contamination of the liquid solvent mixture, which is detrimental.

Typically, additional drying and/or evaporation steps are applied in order to almost completely remove these trace amounts of water and isopropyl alcohol. However, these additional steps are time and cost consuming.

Thus, there is an ongoing demand for a simple, reliable and shortened method for producing in the interior of a production equipment a dehydrated liquid mixture for use as a solvent for a conducting salt, wherein the isopropyl alcohol content in the dehydrated mixture and the water content in the dehydrated mixture is reduced in comparison with the isopropyl alcohol content and the water content in the liquid starting mixture. In particular there is an ongoing demand for a simple, reliable and shortened method, wherein the removal of these trace amounts of water and minor residual amounts of isopropyl alcohol can be carried out simultaneously.

It was, therefore, a first specific object of the present invention to provide a simple, reliable and shortened method for producing in the interior of a production equipment a dehydrated liquid mixture (for use as a solvent for a conducting salt) comprising a reduced amount of isopropyl alcohol and a reduced amount of water, starting from a liquid starting mixture comprising a total amount of 90% by weight or more, based on the total amount of the liquid starting mixture, of compounds selected from the group of organic carbonates, acetic acid esters of C1 to C8 alcohols and butyric acid esters of C1 to C8 alcohols, wherein the total amount of acetic acid esters of C1 to C8 alcohols and butyric acid esters of C1 to C8 alcohols is in the range of from 0 to 45% by weight, based on the total amount of the liquid starting mixture, water in a total amount of 3500 ppm to 20 ppm, based on the total amount of the liquid starting mixture, isopropyl alcohol in a total amount of 100 ppm to 5 ppm, based on the total amount of the liquid starting mixture, and optionally further compounds. The liquid starting mixture as defined has a composition which is typical for state of the art production processes.

According to a first aspect of the present invention the object as stated above is reached) by a method for producing in the interior of a production equipment a dehydrated liquid mixture for use as a solvent for a conducting salt, the method comprising the following steps a) cleaning the interior of the production equipment with isopropyl alcohol, b) removing contaminating substances (e.g. liquid substances, e.g. removal by means of evaporation under vacuum conditions) from the interior of the production equipment after said cleaning with isopropyl alcohol, so that the isopropyl alcohol content in the interior of the production equipment is reduced, c) providing or preparing a liquid starting mixture in said interior of the production equipment after said removal of contaminating substances, wherein the liquid starting mixture in said interior of the production equipment comprises a total amount of 90% by weight or more, based on the total amount of the liquid starting mixture, of compounds selected from the group of organic carbonates, acetic acid esters of C1 to C8 alcohols and butyric acid esters of C1 to C8 alcohols, wherein the total amount of acetic acid esters of C1 to C8 alcohols and butyric acid esters of C1 to C8 alcohols is in the range of from 0 to 45% by weight, based on the total amount of the liquid starting mixture, water in a total amount of 3500 ppm to 20 ppm, based on the total amount of the liquid starting mixture, isopropyl alcohol in a total amount of 100 ppm to 5 ppm, based on the total amount of the liquid starting mixture, optionally further compounds, d) contacting the liquid starting mixture resulting after step c) with an amount of a zeolite molecular sieve such that both the isopropyl alcohol content in the mixture and the water content in the mixture is reduced by interaction with said zeolite molecular sieve.

Throughout this text the term "C1 to C8 alcohols" indicates alcohols having 1 to 8 carbon atoms. Preferably, a C1 to C8 alcohol is (i) aliphatic, (ii) substituted or unsubstituted, and (iii) branched or unbranched.

Furthermore, throughout this text the term "further compounds" indicates compounds other than water, organic carbonates, acetic acid esters of C1 to C8 alcohols, butyric acid esters of C1 to C8 alcohols, and isopropyl alcohol.

Preferred acetic acid esters of C1 to C8 alcohols are acetic acid methyl ester and acetic acid ethyl ester. Preferred butyric acid esters of C1 to C8 alcohols are butyric acid methyl ester and butyric acid ethyl ester.

Preferably, in the method according to the invention (as described above, in particular in a method described as being preferred) the total amount of acetic acid esters of C1 to C8 alcohols and butyric acid esters of C1 to C8 alcohols is in the range of from 0 to 33.4% by weight, based on the total amount of the liquid starting mixture.

Preferred is a method according to the invention (as described above, in particular a method described as being preferred), wherein the total amount of acetic acid esters of C1 to C8 alcohols and butyric acid esters of C1 to C8 alcohols is in the range of from 0 to 45% by weight, preferably in the range of from 0 to 33.4% by weight, based on the total amount of the liquid starting mixture, and/or the liquid starting mixture comprises water in a total amount of 3500 ppm to 20 ppm, preferably in a total amount of 500 ppm to 20 ppm, based on the total amount of the liquid starting mixture.

Preferred is a method according to the invention (as described above, in particular a method described as being preferred), wherein the total amount of acetic acid esters of C1 to C8 alcohols and butyric acid esters of C1 to C8 alcohols is in the range of from 0 to 10% by weight, and preferably is 0% by weight, based on the total amount of the liquid starting mixture. E.g., if the total amount of acetic acid esters of C1 to C8 alcohols and butyric acid esters of C1 to C8 alcohols is 0% by weight (or, e.g., 5% by weight), the total amount of organic carbonates is 90% by weight (or, e.g., 85% by weight, respectively) or more, based on the total amount of the liquid starting mixture.

The term "molecular sieve" as used in the art indicates a class of substances with discrete pore structures that can act as an adsorbent, discriminating between molecules on the basis of size.

The term "zeolite molecular sieve" as used in the art indicates a specific class of molecular sieves, wherein the substances mainly comprise alkali metal crystalline aluminosilicates with a framework structure, exhibiting the general formula $M_{x/n}[(AlO_2)_x(SiO_2)_y]$ $zH_2O$, wherein "M" represents the nonframework metal cation, and "n" is its charge. Synthetic and natural zeolites are known. Natural zeolites are for example clinoptilolite and chabazite. Synthetic zeolites are for example zeolite 4A, zeolite P and zeolite ZSM-5. All these zeolites exhibit as small a pore size as about 6 Angstrom or less and, among others, zeolite 4A has a 8-membered ring pore structure giving a pore size of even 4 Angstrom. For a more detailed definition and discussion of zeolites reference is made to the January 1975 publication of the International Union of Pure and Applied Chemistry entitled "Chemical Nomenclature, and Formulation of Compositions, of Synthetic and Natural Zeolites".

Throughout the specification, the water concentration (amount of water in the liquid starting mixture and in the dehydrated liquid mixture, respectively) is determined quantitatively by coulometric Karl Fischer measurement, if not indicated otherwise.

Throughout the specification, the term "ppm" denotes a mass fraction, if not indicated otherwise.

Own experiments have surprisingly shown that both the isopropyl alcohol content in the (liquid starting) mixture and the water content in the (liquid starting) mixture is simultaneously reduced by interaction with said zeolite molecular sieve. It was surprising that this reduction was simultaneously accomplished in step d), i.e. while contacting the liquid starting mixture with the same amount and same type of the zeolite molecular sieve. This was surprising because the person skilled in the art would not have had expected that water as well as isopropyl alcohol can be removed in such a way. Without wishing to be bound by any specific theory, the skilled person usually expects that water molecules can be efficiently removed by zeolite molecular sieves providing a pore diameter of 3 or 4 angstrom. However, the skilled person would also expect that these zeolite molecular sieves are much less accessible for isopropyl alcohol molecules. Instead, isopropyl alcohol molecules are considerably larger than water molecules, and as a consequence, one would not expect that isopropyl alcohol molecules can be sufficiently removed from the liquid starting mixture together with water molecules in the same step of contacting the liquid starting mixture with the zeolite molecular sieve. According to the general understanding, increasing the pore diameter of the zeolite molecular sieve would on the one hand possibly result in an improved accessibility for isopropyl alcohol molecules, but such measure would on the other hand inevitably and to an inacceptable degree reduce the adsorptive capacity for water molecules. Furthermore, Ullmann's Encyclopedia of Industrial Chemistry (page 480, Vol. A 28, VCH Verlagsgesellschaft, 1996) discloses that, "[ . . . ] Aluminum-rich zeolites preferentially adsorb strongly polar molecules, and are therefore widely used as drying agents [ . . . ]". Thus, the skilled person would expect that water adsorption in such zeolite molecular sieves is much preferred compared to the adsorption of (the considerably less polar) isopropyl alcohol molecules.

The method according to the invention as well as preferred embodiments of the method are also described below in more detail by reference to the appended FIGS. 1 to 3. For further details see below.

Preferred is a method according to the invention (as described above, in particular a method described as being preferred), wherein said zeolite molecular sieve is a zeolite molecular sieve of Linde Type 4A. Zeolite molecular sieves of Linde Type 4A are binderless or binder-containing zeolite molecular sieves. In some applications it is preferred that the zeolite molecular sieve is a binderless zeolite molecular sieve of Linde Type 4A. However, in other applications a binder-containing zeolite molecular sieve of Linde Type 4A is preferred.

The term "binderless zeolite molecular sieve" as used in the art indicates a zeolite molecular sieve wherein the total amount of alkali metal crystalline aluminosilicates with a framework structure (as defined above) is preferably 95 to 100% by weight (usually almost 100% by weight), based on the total amount of the binderless zeolite molecular sieve, which means that no significant amount of binder is contained in the binderless zeolite molecular sieve.

Preferably, in the method according to the invention (as described above, in particular in methods described as being preferred), 70% to 100% by weight of the zeolite molecular sieve contacted with the liquid starting mixture is a sodium zeolite molecular sieve, preferably a sodium zeolite molecular sieve of Linde Type 4A, based on the total amount of zeolite molecular sieve contacted with the liquid starting mixture.

In other preferred methods according to the invention (as described above, in particular in methods described as being preferred) it is preferred that 70% to 100% by weight of the binderless zeolite molecular sieve contacted with the liquid starting mixture is a binderless sodium zeolite molecular sieve, preferably a binderless sodium zeolite molecular sieve of Linde Type 4A, based on the total amount of binderless zeolite molecular sieve contacted with the liquid starting mixture.

The amount of sodium ions in a zeolite molecular sieve material can be determined by XRPD measurements (X-ray powder diffraction).

Depending on the application, in some cases a method according to the invention (a method as described above, in particular a method described as being preferred) is preferred, wherein 70% to 100% by weight of the zeolite molecular sieve contacted with the liquid starting mixture is a (preferably binderless) lithium zeolite molecular sieve, preferably a (preferred binderless) lithium zeolite molecular sieve of Linde Type A, based on the total amount of zeolite molecular sieve contacted with the liquid starting mixture.

The amount of lithium ions in a lithium zeolite molecular sieve material can be determined also by XRPD measurements (X-ray powder diffraction).

A (binderless) sodium zeolite molecular sieve of Linde Type 4A exhibits the typical composition of a unit cell of $Na_{12}[AlO_2]_{12}(SiO_2)_{12}*27\ H_2O$. This (binderless) zeolite has, as already described above, a pore size of 4 Angstrom which is well suited to allow water molecules to enter into and get adsorbed within the framework structure. As now shown by own experiments, such a zeolite molecular sieve is also suited to efficiently co-adsorb and remove isopropyl alcohol molecules that are present in a liquid starting mixture. Furthermore, this (binderless) zeolite is not a substitution-type zeolite, which means that the sodium ions (i.e. the originally present sodium ions) are not replaced to a significant amount by any other type of cations, more preferably not replaced by lithium ions. As a consequence, (binderless) sodium zeolite molecular sieves of Linde Type 4A are cost efficient and well suited in the method according to the present invention in order to simultaneously reduce both the water content and the isopropyl alcohol content of a liquid starting mixture not comprising a lithium conducting salt.

In addition to zeolite molecular sieves of Linde Type 4A other zeolite molecular sieves of various types might be suited to simultaneously adsorb both water and isopropyl alcohol. Such other zeolite molecular sieves need to exhibit a pore diameter sufficient to allow both water molecules and isopropyl alcohol molecules to enter into and get adsorbed within the framework structure of the zeolite molecular sieve material.

In some rare cases it is preferred that in the method according to the invention (as described above, in particular in methods described as being preferred) the (binderless) zeolite molecular sieve is of Linde Type 3A. A (binderless) zeolite molecular sieve of type 3A has a pore size of 3 Angstrom and is still suited to allow water molecules to enter into the framework structure such that the water content in the liquid starting mixture is reduced. The predominant cations in the framework structure are potassium ions (replacing or substituting the originally present sodium ions) in order to arrive at the pore size of 3 Angstrom. Thus, the pore diameter of 3 Angstrom is typically less suited to efficiently co-adsorb isopropyl alcohol molecules (besides water molecules).

In other cases it is preferred that in the method according to the invention (as described above, in particular in methods described as being preferred) the (binderless) zeolite molecular sieve is of Linde Type 5A. A (binderless) zeolite molecular sieve of type 5A has a pore size of 5 Angstrom and is in some cases still acceptably suited to allow water molecules to enter into the framework structure such that the water content and—besides water—the isopropyl alcohol content in the liquid starting mixture is reduced. The predominant cations are calcium ions (replacing or substituting the originally present sodium ions) in order to arrive at the pore size of 5 Angstrom. However, the pore diameter of 5 Angstrom appears less suited to efficiently and simultaneously remove both water and isopropyl alcohol molecules. In addition, calcium ions released by the (binderless) zeolite molecular sieve material of Linde type 5A might contaminate the resultant dehydrated liquid mixture. Furthermore, the use of (binderless) zeolite molecular sieves of Linde Type 5A usually increase the costs because Type 5A sieve materials are typically produced in additional steps from Type 4A materials.

In other rare cases it is preferred that in the method according to the invention (as described above, in particular in methods described as being preferred) the (binderless) zeolite molecular sieve is of Linde Type 13X. Molecular sieves of the X type vary from the A type in the internal character of the crystalline structure, zeolite 13X is of the faujasite type, its formula is $Na_{86}(H_2O)_{264}[Al_{86}Si_{106}O_{384}]$. A (binderless) zeolite molecular sieve of type 13X has a pore size of 10 Angstrom and—depending on the application—is also acceptably suited in rare cases to allow water molecules as well as isopropyl alcohol molecules to enter into and get adsorbed within the framework structure. The predominant cations are also sodium ions. However, as shown in own experiments, zeolite molecular sieves of Linde Type 13X are less suited to efficiently and simultaneously remove both water and isopropyl alcohol molecules.

Preferably, in the method according to the invention (as described above, in particular in a method described as being preferred), the total amount of compounds selected from the group of organic carbonates, acetic acid esters of C1 to C8 alcohols and butyric acid esters of C1 to C8 alcohols, (wherein the total amount of acetic acid esters of C1 to C8 alcohols and butyric acid esters of C1 to C8 alcohols is in the range of from 0 to 45% by weight, preferably in the range of from 0 to 33.4% by weight, based on the total amount of the liquid starting mixture), is 92% by weight or more, preferably 94% by weight or more, based on the total amount of the liquid starting mixture.

In a preferred method according to the invention (as described above, in particular in a method described as being preferred) additional cleaning steps prior to step a) of the method of the present invention are performed. Such additional cleaning steps preferably include the use of compounds other than isopropyl alcohol (i.e., e.g. water). In addition, such additional cleaning steps are typically accompanied by steps of removing said compounds. Thus, preferred is a method according to the invention (as described above, in particular a method described as being preferred) additionally comprising the steps (i) cleaning the interior of said production equipment with water and (ii) after step (i) reducing the water content in the interior of the production equipment, wherein steps (i) and (ii) are carried out prior to step a).

Water, which is easily available, is an excellent solvent in order to dissolve polar foreign substances or compounds. However, prior to or after steps (i) and (ii) other cleaning steps (i.e. cleaning steps different from (i) and (ii)) can basically be performed using other cleaning compounds or other cleaning mixtures or otherwise different cleaning conditions. Such other cleaning compounds and other cleaning mixtures, respectively, are or comprise for example organic compounds, surfactants, acids, alkaline compounds and compounds forming an azeotrope with water. Preferred organic compounds are alcohols (preferably selected from the group consisting of methanol, ethanol and phenol) acetone and toluene. The skilled person is aware of potential interactions between compounds of the liquid starting mixture and other cleaning compounds or other cleaning mixtures as well as of potential interactions between said other cleaning compounds or other cleaning mixtures and the material of the interior of the production equipment. Thus, only other cleaning compounds or other cleaning mixtures are suited which do not harm or destroy the production equipment, in particular the interior of the production equipment.

These other cleaning compounds or other cleaning mixtures are preferably not water, isopropyl alcohol, organic carbonates, acetic acid esters of C1 to C8 alcohols and butyric acid esters of C1 to C8 alcohols. However, after the interior of the production equipment was cleaned with one or more than one of the other cleaning compounds or other cleaning mixtures the interior is preferably cleaned with water as described above in steps (i) and (ii).

In particular preferred is a method according to the invention (as described above, in particular a method described as being preferred), wherein the method consists of steps (i), (ii), a), b), c) and d), preferably as described in detail with reference to FIG. 3.

In step a) of the method according to the invention (as described above, in particular in a method described as being preferred) the interior of the production equipment is cleaned with isopropyl alcohol. This means that the isopropyl alcohol is contacting the inner surfaces of the interior of the production equipment. Preferably, while contacting said inner surfaces, the isopropyl alcohol is in a liquid state. In some methods according to the invention, wherein the interior of the production equipment is additionally cleaned with water (see step (i) as described above) and/or cleaned with said other cleaning compounds or other cleaning mixtures, this water and/or these compounds or mixtures preferably also contact the inner surface of the interior of the production equipment and are preferably (while contacting) in a liquid state. Thus, preferred is a method according to the invention (as described above, in particular a method described as being preferred), wherein the cleaning in one or more than one cleaning steps is carried out by flushing or rinsing the interior of the production equipment. It is thereby preferred that the cleaning compounds or other cleaning mixtures, preferably the isopropyl alcohol, circulate within the interior of the production equipment (e.g., the cleaning compounds or other cleaning mixtures, preferably the isopropyl alcohol, are refluxed within the interior of the production equipment). Preferably, said circulation step/reflux step is repeated at least one time.

In step b) of the method according to the invention (as described above, in particular in a method described as being preferred) contaminating substances are removed. The term "contaminating substances" includes for example any kind of foreign substances and/or chemical compounds, in particular isopropyl alcohol and water. Thus, preferred is a method according to the invention (as described above, in particular a method described as being preferred), wherein the contaminating substances are or comprise one or more than one compounds selected from the group consisting of water, alcohols, toluene and acetone, wherein the alcohols are preferably from the group consisting of methanol, ethanol and isopropyl alcohol, and more preferably the one compound or one of the more than one compounds is isopropyl alcohol. In step b) the removing of liquid contaminating substances usually comprises one first step selected from the group of steps consisting of (actively) pumping or sucking out contaminating substances and (passively) allow for running off (draining) contaminating substances from the interior of the production equipment in order to remove the major volume of the contaminating substances. However, after either (actively) pumping or sucking out said contaminating substances or (passively) allow for running off (draining) said contaminating substances from the interior of the production equipment usually small amounts of these contaminating substances remain in the interior of the production equipment. In additional steps remaining amounts of contaminating substances are removed prior to step c).

In preferred methods according to the invention, wherein the interior of the production equipment is additionally cleaned with water (see step (i) as described above) or cleaned with other cleaning compounds or other cleaning mixtures (prior to or after step (i)) the water as well as these other cleaning compounds or other cleaning mixtures are also (actively) pumped or sucked out and/or (passively) allowed to run off (drained) from the interior of the production equipment.

In order to remove remaining amounts of contaminating substances, in some embodiments a method according to the invention (as described above, in particular a method described as being preferred) is very preferred, wherein the removing of the contaminating substances comprises the step of removing contaminating substances from the interior of the production equipment by vacuum evaporation at a pressure in the range of from 0.01 mbar to 850 mbar, preferably in the range of from 0.1 mbar to 500 mbar, more preferably in the range of from 1 mbar to 100 mbar. This vacuum evaporation is preferably conducted for a period of time in the range of from 5 minutes to 300 minutes, preferably in the range of from 30 minutes to 180 minutes, more preferably in the range of from 45 minutes to 90 minutes. The removing by means of vacuum evaporation as described above is typically the most preferred means in order to remove remaining amounts of contaminating substances from the interior of the production equipment.

In other embodiments, preferred is a method according to the invention (as described above, in particular a method described as being preferred), wherein the removing of the contaminating substances comprises the step of purging the interior of the production equipment with a purge gas, preferably nitrogen gas, wherein more preferably the nitrogen gas has a temperature in the range of from 273.15 Kelvin to 473.15 Kelvin, preferably in the range of from 293.15 Kelvin to 373.15 Kelvin. It is also preferred that the purge gas is dry air, preferably dry air at a temperature in the range of from 273.15 Kelvin to 473.15 Kelvin. Preferably, the purging with e.g. nitrogen gas or dry air is conducted for a period of time in the range of from 5 minutes to 300 minutes, preferably in the range of from 30 minutes to 180 minutes, more preferably in the range of from 45 minutes to 90 minutes.

Both, vacuum evaporation and purging the interior of the production equipment with a purge gas (preferably nitrogen gas) are preferred means to remove remaining amounts of contaminating substances after the major volume of these contaminating substances has been already (actively) pumped or sucked out and/or (passively) allowed to run off (drained) from the interior of the production equipment.

In some embodiments of the present invention it is preferred to apply both the vacuum evaporation at a pressure in the range of from 0.01 mbar to 850 mbar, preferably in the range of from 0.1 mbar to 500 mbar, more preferably in the range of from 1 mbar to 100 mbar and the purging of the interior of the production equipment with nitrogen gas, wherein preferably the nitrogen gas has a temperature in the range of from 273.15 Kelvin to 473.15 Kelvin, preferably in the range of from 293.15 Kelvin to 373.15 Kelvin. In this case it is preferred that the purging of the interior of the production equipment with nitrogen gas is conducted before the vacuum evaporation is applied.

In case the production equipment includes parts where no vacuum evaporation can be applied, purging the interior of those parts of the production equipment with a purge gas, preferably nitrogen gas (alternatively with dry air), is preferred.

It is also preferred that in the method of the invention (as described above, in particular a method described as being preferred) the inner surfaces of the interior of the production equipment are heated, preferably to a temperature in the range of 273.15 Kelvin to 473.15 Kelvin, more preferably to a temperature in the range of 293.15 Kelvin to 423.15 Kelvin, even more preferably to a temperature in the range of 303.15 Kelvin to 373.15 Kelvin, most preferably to a temperature in the range of from 0 to 20 Kelvin above the boiling point (at the respective applied pressure) of the contaminating substance or one of the contaminating substances. In case the contaminating substance is a mixture of two or more compounds, one particular boiling point of one of these compounds is preferably chosen or, if exhibited by the mixture, the boiling point of the mixture (e.g. the boiling point of an azeotropic mixture). Very preferably the temperature is adjusted to be in the range of 0 to 20 Kelvin above the boiling point of isopropyl alcohol (at the respective pressure). It is additionally preferred that this heating is in particular carried out while the vacuum evaporation is applied (as described above, in particular the vacuum evaporation described above as being preferred).

In the method of the present invention (as described above, in particular a method described as being preferred) it is also preferred that such heating is also applied while step a) is carried out, i.e. while the interior of the production equipment is cleaned with isopropyl alcohol.

In a particularly preferred method according to the invention (as described above, in particular a method described as being preferred) the removing of the remaining amounts of the contaminating substances from the interior of the production equipment comprises the following steps:

in a first step: vacuum evaporation as described above (preferably as described as being preferred), in a second step (after the first step): releasing vacuum and subsequent purging of the interior of the production equipment with a purge gas, preferably nitrogen gas (as described above, in particular a purging step as described as being preferred), (While the second step is conducted, the inner surfaces of the interior of the production equipment are preferably heated, preferably to a temperature in the range of 273.15 Kelvin to 473.15 Kelvin, more preferably to a temperature in the range of 293.15 Kelvin to 423.15 Kelvin, even more preferably to a temperature in the range of 303.15 Kelvin to 373.15 Kelvin, most preferably to a temperature in the range of from 0 to 20 Kelvin above the boiling point (at the respective applied pressure) of the contaminating substance or one of the contaminating substances. In case the contaminating substance is a mixture of two or more compounds, one particular boiling point of one of these compounds is preferably chosen or, if exhibited by the mixture, the boiling point of the mixture (e.g. the boiling point of an azeotropic mixture). Preferably, the aforementioned temperatures are applied at (or close to) 1013.25 hPa, referring to the pressure within the production equipment. Very preferably the temperature is adjusted to be in the range of 0 to 20 Kelvin above the boiling point of isopropyl alcohol (at the respective pressure). The skilled person is aware of all needed measures to carry out such heating.), repeating the first and second step (as defined above), preferably three times, more preferably four times.

Of course, other means are known to the skilled person in order to remove remaining amounts of contaminating substances. For example, for removal of remaining amounts of contaminating substances the inner surfaces of the interior of the production equipment are contacted with one or more than one organic carbonates, in particular one or more than one organic carbonate as present in the liquid starting mixture. In case more than one organic carbonates are applied, these organic carbonates are preferably applied (i) as a mixture or (ii) consecutively one after another. A preferred organic carbonate for removing remaining amounts of contaminating substances is diethyl carbonate. In some cases a method according to the invention (as described above, in particular a method described as being preferred) is preferred, wherein for removal of remaining amounts of contaminating substances the inner surfaces of the interior of the production equipment are contacted with one or more than one organic carbonates, preferably with one or more than one organic carbonates as present in the liquid starting mixture. In such a case, for removal of remaining amounts of contaminating substances by means of organic carbonates the resulting mixture comprising said organic carbonates and amounts of contaminating substances is removed from the interior of the production equipment (as already described above for the removing step).

However, in other cases a method according to the invention (as described above, in particular a method described as being preferred) is preferred, wherein for removal of remaining amounts of contaminating substances the inner surfaces of the interior of the production equipment are not contacted with one or more than one of said organic carbonates.

As already discussed above, for reduction of the water content and the isopropyl alcohol content the liquid starting mixture resulting after step c) is contacted with an amount of a zeolite molecular sieve. Principally, the zeolite molecular sieve is not included in the production equipment prior to step a) and while step a) is carried out. In a preferred method according to the invention (as described above, in particular a method described as being preferred) the zeolite molecular sieve is also not present while the major volume of the contaminating substances is (actively) pumped or sucked out and/or (passively) allowed to run off (drained) from the interior of the production equipment in step b) of the method according to the present invention. However, in cases, wherein for removal of remaining amounts of contaminating substances the inner surfaces of the interior of the production equipment are contacted with one or more than one organic carbonates, a method according to the invention (as described above, in particular a method described as being preferred) is preferred, wherein the zeolite molecular sieve is included in the production equipment while for removal of remaining amounts of contaminating substances the inner surfaces of the interior of the production equipment are contacted with said organic carbonates. In some cases it is preferred that (while for removal of remaining amounts of contaminating substances the inner surfaces of the interior of the production equipment are contacted with said organic carbonates) the inner surfaces of the interior of the production equipment are heated to a temperature such that said organic carbonates evaporate.

In another preferred method the zeolite molecular sieve is not included in the production equipment while step b) of the method according to the invention is carried out. This ensures that the zeolite molecular sieve is not unnecessarily contaminated prior to step c).

As mentioned above, the liquid starting mixture comprises water in a total amount of 3500 ppm to 20 ppm, based on the total amount of the liquid starting mixture. Preferred is a method according to the invention (as described above, in particular methods described as being preferred), wherein the total amount of water in the liquid starting mixture is in the range of from 3000 ppm to 20 ppm or in the range of from 2000 ppm to 20 ppm or in the range of from 1000 ppm to 20 ppm or in the range of from 500 ppm to 20 ppm or in the range of from 400 ppm to 20 ppm or in the range of from 300 ppm to 20 ppm or in the range of from 200 ppm to 20 ppm or in the range of from 150 ppm to 20 ppm, based on the total amount of the liquid starting mixture.

Preferred is a method according to the invention (as described above, in particular methods described as being preferred), wherein in step d) the water content in the mixture is reduced to an amount of less than 20 ppm, based on the total amount of the dehydrated liquid mixture.

For a given liquid starting mixture comprising a certain amount of water (preferably as defined above) the skilled person in an attempt to produce a dehydrated liquid mixture, wherein the water content is reduced, preferably to an amount of less than 20 ppm, based on the total amount of the dehydrated liquid mixture, will select a (binderless) zeolite molecular sieve and will favorably and is herewith encouraged to conduct a series of simple experiments in order to determine the minimum amount of the selected (binderless) zeolite molecular sieve. By doing so, the skilled person is both able to avoid the use of unnecessary large amounts of (binderless) zeolite molecular sieve and to avoid the use of too little amounts of (binderless) zeolite molecular sieve.

In the method according to the invention the liquid starting mixture comprises one, two, three or more than three organic carbonates. An organic carbonate is often also referred to as carbonate ester, or organocarbonate, and is a diester of carbonic acid. In the method according to the invention (as described above, in particular in a method described as being preferred) the one organic carbonate or each of the two, three or more organic carbonates is preferably a monomeric organic carbonate, i.e. the one organic carbonate or each of the two, three or more organic carbonate is not a polycarbonate.

Preferred is a method according to the invention (as described above, in particular in a method described as being preferred), wherein the one organic carbonate or each of the two, three or more organic carbonates, respectively, is a compound of Formula (I)

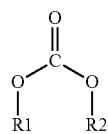

(I)

wherein independently for each of said organic carbonates R1 and R2 independently of each other denote an alkyl group having one or more carbon atoms or R1 and R2 together constitute a substituted or unsubstituted alkylene bridge linking the esterified oxygens of the diester.

In some cases it is preferred that the alkylene bridge linking the esterified oxygens of the diester is unsubstituted. However, in other cases it is preferred that one or more hydrogen atoms of the alkylene bridge linking the esterified oxygens of the diester are substituted, wherein the substituents are selected from the group consisting of halogen, alkylidene, vinyl and alkyl. Preferred are substituents selected from the group consisting of F, Cl, Br, I, methylidene, ethylidene, vinyl, methyl, ethyl and propyl, more preferably F, Cl, methylidene, methyl, vinyl and ethyl.

Preferably, in the method according to the invention (as described above, in particular in a method described as being preferred) the total number of carbon atoms in R1 plus R2 is in the range of from 2 to 10, more preferably in the range of from 2 to 6, most preferably in the range of from 2 to 4.

If R1 and R2 independently of each other denote an alkyl group, preferably one or each of R1 and R2 independently of each other comprise a number of carbon atoms in the range of from 1 to 5, more preferably in the range of from 1 to 3, most preferably in the range of from 1 to 2.

An unsubstituted alkylene bridge linking the esterified oxygens of the diester is a functional group of formula —$(CH_2)_n$—, wherein n is a positive integer, preferably a positive integer in the range of from 2 to 10, more preferably in the range of from 2 to 6, even more preferably in the range of from 2 to 4, wherein more most preferably n is 2. The dashes "-" in the formula indicate the bonds to the esterified oxygens of the diester.

Preferably, in the method according to the invention (as described above, in particular in a method described as being preferred) in a substituted alkylene bridge linking the esterified oxygens of the diester the total number of carbon atoms (in R1 plus R2) is in the range of from 2 to 10, more preferably in the range of from 2 to 6, even more preferably in the range of from 2 to 4, and wherein most preferably the number of carbon atoms in the main chain of the bridge linking the esterified oxygens of the diester is 2.

In some cases, a preferred organic carbonate, wherein R1 and R2 together constitute a substituted alkylene bridge linking the esterified oxygens of the diester is a compound of Formula (Ia)

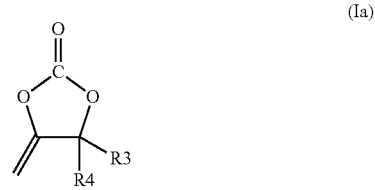

(Ia)

wherein R3 and R4 independently of each other are selected from the group consisting of hydrogen and alkyl, preferably hydrogen, methyl, ethyl and propyl, more preferably hydrogen, methyl and ethyl. If both R3 and R4 are hydrogen, the compound is 4-methylene-1,3-dioxolan-2-one.

Preferably, in the method according to the invention (as described above, in particular in a method described as being preferred), the one organic carbonate or each of the two, three or more organic carbonates, respectively, is a compound of Formula (I)

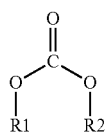

(I)

wherein independently for each of said organic carbonates R1 and R2 independently of one another denote an alkyl group selected from the group consisting of methyl, ethyl, n-propyl, isopropyl, n-butyl, isobutyl, tert.-butyl, sec.-butyl, n-pentyl (amyl), 2-pentyl (sec.-pentyl), 3-pentyl, 2-methylbutyl, 3-methylbutyl (isopentyl), 3-methylbut-2-yl, 2-methylbut-2-yl and 2,2-dimethyl-propyl (neopentyl), preferably selected from the group consisting of methyl and ethyl.

Preferably, in the method according to the invention (as described above, in particular in a method described as being preferred) the one organic carbonate or each of the two, three or more organic carbonates, respectively, is selected from the group consisting of dimethyl carbonate, diethyl carbonate, ethyl methyl carbonate, propylene carbonate, fluoroethylene carbonate, 4,4-dimethyl-5-methylene-1,3-dioxolan-2-one, 4-methyl-5-methylene-1,3-dioxolan-2-one, 4-methylene-1,3-dioxolan-2-one, vinyl ethylene carbonate and ethylene carbonate, preferably selected from the group consisting of ethylene carbonate, diethyl carbonate, ethyl methyl carbonate, dimethyl carbonate, fluoroethylene carbonate and propylene carbonate.

This means that the one organic carbonate or each of the two, three or more organic carbonates, respectively, is preferably selected from the group consisting of

| compound | structural formula | R1, R2 | total number of carbon atoms in R1 plus R2/total number of carbon atoms in main chain of bridge (i.e. total number of carbon atoms in R1 plus R2 minus carbon atoms in side chain of bridge) |
|---|---|---|---|
| dimethyl carbonate | | R1 = R2 = methyl | 2/– |
| diethyl carbonate | | R1 = R2 = ethyl | 4/– |
| ethyl methyl carbonate | | R1 = methyl R2 = ethyl | 3/– |
| ethylene carbonate | | R1 plus R2 = unsubstituted alkylene bridge = ethylene bridge | 2/2 |
| propylene carbonate | | R1 plus R2 = substituted alkylene bridge, substituent: methyl | 3/2 (i.e. 1 carbon atom in side chain) |
| 4,4-dimethyl-5-methylene-1,3-dioxolan-2-one | | R1 plus R2 = substituted alkylene bridge, substituents: methylidene, methyl, methyl | 5/2 (i.e. 3 carbon atoms in side chain) |

| compound | structural formula | R1, R2 | total number of carbon atoms in R1 plus R2/total number of carbon atoms in main chain of bridge (i.e. total number of carbon atoms in R1 plus R2 minus carbon atoms in side chain of bridge) |
|---|---|---|---|
| 4-methyl-5-methylene-1,3-dioxolan-2-one | | R1 plus R2 = substituted alkylene bridge, substituents: methylidene, methyl | 4/2 (i.e. 2 carbon atoms in side chain) |
| 4-methylene-1,3-dioxolan-2-one | | R1 plus R2 = substituted alkylene bridge, substituent: methylidene | 3/2 (i.e. 1 carbon atom in side chain) |
| fluoroethylene carbonate | | R1 plus R2 = substituted alkylene bridge, substituent: F | 2/2 |
| vinyl ethylene carbonate (4-vinyl-1,3-dioxolan-2-one) | | R1 plus R2 = substituted alkylene bridge, substituent: vinyl | 4/2 (i.e. 2 carbon atoms in side chain) |

Preferably, a liquid starting mixture (as described above, in particular a mixture described as being preferred) comprises two, three or four organic carbonates in a total amount of 90% by weight or more, based on the total amount of the liquid starting mixture, more preferably two, three or four organic carbonates selected from the group consisting of dimethyl carbonate, diethyl carbonate, ethyl methyl carbonate, propylene carbonate, fluoroethylene carbonate, 4,4-dimethyl-5-methylene-1,3-dioxolan-2-one, 4-methyl-5-methylene-1,3-dioxolan-2-one, 4-methylene-1,3-dioxolan-2-one, vinyl ethylene carbonate and ethylene carbonate, preferably combinations of carbonates indicated in the following tables, and more preferably in the amounts and ratios also indicated in the following tables. In the tables, "% by weight" relates to the total amount of said organic carbonates in the liquid starting mixture:

(i) liquid starting mixtures comprising two organic carbonates:

| Carbonate 1 | Carbonate 2 | % by weight | |
|---|---|---|---|
| ethylene carbonate | ethyl methyl carbonate | 50 | 50 |
| ethylene carbonate | ethyl methyl carbonate | 30 | 70 |
| ethylene carbonate | dimethyl carbonate | 50 | 50 |
| ethylene carbonate | dimethyl carbonate | 30 | 70 |
| ethylene carbonate | diethyl carbonate | 50 | 50 |
| ethylene carbonate | diethyl carbonate | 30 | 70 |
| propylene carbonate | ethyl methyl carbonate | 50 | 50 |
| propylene carbonate | ethyl methyl carbonate | 75 | 25 |
| fluoroethylene carbonate | dimethyl carbonate | 20 | 80 |

(ii) liquid starting mixtures comprising three organic carbonates:

| Carbonate 1 | Carbonate 2 | Carbonate 3 | % by weight | | |
|---|---|---|---|---|---|
| ethylene carbonate | ethyl methyl carbonate | dimethyl carbonate | 33⅓ | 33⅓ | 33⅓ |
| ethylene carbonate | ethyl methyl carbonate | dimethyl carbonate | 30 | 40 | 30 |
| ethylene carbonate | diethyl carbonate | dimethyl carbonate | 33⅓ | 33⅓ | 33⅓ |
| fluoroethylene carbonate | diethyl carbonate | dimethyl carbonate | 33⅓ | 33⅓ | 33⅓ |
| fluoroethylene carbonate | diethyl carbonate | dimethyl carbonate | 20 | 40 | 40 |
| ethylene | dimethyl | fluoroethylene | 33⅓ | 33⅓ | 33⅓ |

-continued

| Carbonate 1 | Carbonate 2 | Carbonate 3 | % by weight | | |
|---|---|---|---|---|---|
| ethylene carbonate | carbonate propylene carbonate | carbonate ethyl methyl carbonate | 20 | 20 | 60 |
| ethylene carbonate | propylene carbonate | dimethyl carbonate | 20 | 20 | 60 |
| ethylene carbonate | propylene carbonate | dimethyl carbonate | 25 | 15 | 60 |
| ethylene carbonate | propylene carbonate | dimethyl carbonate | 42.5 | 15 | 42.5 |
| ethylene carbonate | dimethyl carbonate | ethyl acetate | 33⅓ | 33⅓ | 33⅓ |

(iii) liquid starting mixtures comprising four organic carbonates:

| Carbonate 1 | Carbonate 2 | Carbonate 3 | Carbonate 4 | % by weight | | | |
|---|---|---|---|---|---|---|---|
| ethylene carbonate | propylene carbonate | dimethyl carbonate | ethyl methyl carbonate | 25 | 11 | 44 | 20 |
| ethylene carbonate | propylene carbonate | dimethyl carbonate | ethyl methyl carbonate | 50 | 12.5 | 12.5 | 25 |

The aforementioned organic carbonates are often used in a liquid solvent mixture for a lithium conducting salt. In some cases ethylene carbonate and/or propylene carbonate are used as major solvent. However, ethylene carbonate shows high viscosity at room temperature (25° C.) so that additional organic carbonates are added in order to lower the viscosity at room temperature, e.g. dimethyl carbonate, diethyl carbonate, and/or ethyl methyl carbonate are added. Such mixtures, comprising one or more major solvents as well as additional organic carbonates in order to lower the viscosity are well usable/processable at room temperature.

Preferably, in the method according to the invention (as described above, in particular in a method described as being preferred), the liquid starting mixture comprises each of ethyl methyl carbonate, ethylene carbonate, and diethyl carbonate, wherein the ratio of the weights of ethyl methyl carbonate, ethylene carbonate and diethyl carbonate in the liquid starting mixture preferably is (>1):1:(<1), or wherein the liquid starting mixture comprises propylene carbonate, wherein the amount of propylene carbonate in the liquid starting mixture is higher than the amount of any other carbonate in the liquid starting mixture, preferably higher than the total amount of other carbonates, more preferably higher than 50% by weight of the liquid starting mixture, based on the total amount of the liquid starting mixture.

Preferably, in the method according to the invention (as described above, in particular in a method described as being preferred), the liquid starting mixture comprises less than 5% by weight of LiPF$_6$ as an optional further compound, based on the total amount of the liquid starting mixture, preferably less than 5% by weight of lithium conducting salts, more preferably less than 5% by weight of conducting salts at all (for more details regarding optional further compounds see below).

More preferably, in the method according to the invention (as described above, in particular in a method described as being preferred) the liquid starting mixture comprises no LiPF$_6$, preferably no Lithium conducting salts, more preferably no conducting salts at all.

However, the dehydrated liquid mixture to be produced according to the (first) method of the present invention, i.e. the dehydrated liquid mixture comprising a reduced water content and a reduced isopropyl alcohol content (compared to the liquid starting mixture), is preferably suitable for use as a solvent for a lithium conducting salt, preferably LiPF$_6$.

As mentioned above, the isopropyl alcohol content and the water content of the liquid starting mixture can be simultaneously reduced by contacting the liquid starting mixture with an amount of a zeolite molecular sieve. Preferred is a method according to the invention (as described above, in particular a method described as being preferred) wherein the liquid starting mixture in the interior of the production equipment comprises isopropyl alcohol in a total amount of 100 ppm to 25 ppm, preferably alcohols selected from the group consisting of methanol, ethanol and isopropyl alcohol in a total amount of 100 ppm to 25 ppm, more preferably alcohols in a total amount of 100 ppm to 25 ppm, based on the total amount of the liquid starting mixture, and wherein in step d) the isopropyl alcohol content in the mixture is reduced to an amount of less than 25 ppm, preferably the total amount of alcohols selected from the group consisting of methanol, ethanol and isopropyl alcohol is reduced to an amount of less than 25 ppm, more preferably the total amount of alcohols is reduced to an amount of less than 25 ppm, based on the total amount of the dehydrated liquid mixture.

The above mentioned preferred method comprises also the preferred embodiment wherein the liquid starting mixture in the interior of the production equipment comprises isopropyl alcohol in a total amount of 100 ppm to 25 ppm, preferably alcohols selected from the group consisting of methanol, ethanol and isopropyl alcohol in a total amount of 100 ppm to 25 ppm, based on the total amount of the liquid starting mixture, and wherein in step d) the total amount of alcohols is reduced to an amount of less than 25 ppm, based on the total amount of the dehydrated liquid mixture. This means that the total amount of alcohols includes the amount of isopropyl alcohol.

Also the following preferred embodiment is included, wherein the liquid starting mixture in the interior of the production equipment comprises alcohols selected from the group consisting of methanol, ethanol and isopropyl alcohol in a total amount of 100 ppm to 25 ppm, preferably alcohols in a total amount of 100 ppm to 25 ppm, based on the total amount of the liquid starting mixture, and wherein in step d) the isopropyl alcohol content in the mixture is reduced to an amount of less than 25 ppm, based on the total amount of the dehydrated liquid mixture. In the latter case, said alcohols (in a total amount of 100 ppm to 25 ppm, based on the total amount of to the liquid starting mixture) comprise isopropyl alcohol.

More preferably, in the method according to the invention (as described above, in particular a method described as being preferred, and very preferably in the preferred embodiments described above), the isopropyl alcohol content in the mixture is reduced to an amount of less than 5 ppm, based on the total amount of the dehydrated liquid mixture, even more preferably the total amount of alcohols selected from the group consisting of methanol, ethanol and isopropyl alcohol in the mixture is reduced to an amount of less than 5 ppm, and most preferably the entire alcohol content in the mixture is reduced to an amount of less than 5 ppm, based on the total amount of the dehydrated liquid mixture.

If not indicated otherwise, in order to determine whether the alcohol content (in particular the isopropyl alcohol content) is less than 25 ppm, preferably less than 5 ppm, based on the total amount of the dehydrated liquid mixture, the concentration of alcohols (in particular of isopropyl alcohol) can be quantitatively determined by Headspace GC (gas chromatography) measurements. The skilled person is aware of the practical requirements to be met in order to arrive at reliable results.

As mentioned above, various zeolite molecular sieves can be used in step d) of the method according to the present invention (e.g. binderless or binder-containing zeolite molecular sieves of various types; for more information see above). The zeolite molecular sieves for reducing the water content and the isopropyl alcohol content in the liquid starting mixture may be provided as powder or as shaped bodies, the use of shaped bodies being preferred.

Thus, preferred is a method according to the invention (as described above, in particular a method described as being preferred), wherein the zeolite molecular sieve comprises or consists of shaped bodies, preferably of shaped bodies exhibiting a spherical or cylindrical shape. In some cases, alternative shapes of the shaped bodies are preferred including trefoil, elliptical and hollow shapes.

Preferably, in the method according to the invention (as described above, in particular in a method described as being preferred), the shaped bodies constituting the zeolite molecular sieve, preferably the shaped bodies exhibiting a spherical, cylindrical, trefoil, elliptical or hollow shape, exhibit a maximum diameter in the range of from 0.3 to 5.1 mm, to preferably in the range of from 1.6 to 2.5 mm or 2.5 to 5.0 mm. The aforementioned features are preferably combined with the feature of a binderless zeolite molecular sieve.

Shaped bodies exhibiting the aforementioned shapes and maximum diameters are particularly well suited for use in a method of the present invention, in particular in technical large scale productions. Such shaped bodies are easy to handle, in particular for recycling procedures in order to regenerate the zeolite molecular sieve after contact with the liquid starting mixture.

Furthermore, shaped bodies of zeolite molecular sieve materials are in particular suited to be used in a packed bed, e.g. in dehydration columns in order to:
stabilize the pressure conditions in a dehydration column (or other packed beds),
avoid or reduce the amount of powdery dust,
facilitate the exchange of the zeolite molecular sieve materials in the dehydration column (or other packed beds).

Zeolites are available as natural or synthetic zeolites. Own experiments have revealed that corresponding to the intended use both natural and synthetic zeolites can be used to reduce the isopropyl alcohol content and the water content in the liquid starting mixture. However, in a preferred method according to the invention (as described above, in particular in a method described as being preferred) the zeolite of the (binderless) zeolite molecular sieve is a synthetically manufactured zeolite. Synthetically manufactured zeolites are of consistently good quality, exhibit a maximum adsorption capacity, are cost efficient in comparison to natural zeolites, and comprise very low amounts of contaminations (i.e. foreign ions).

The method according to the invention (as described above, in particular a method described as being preferred) is preferably conducted in a production unit of a plant. Preferred is a method, wherein the amount of the zeolite molecular sieve is provided as a packed bed, preferably a packed column, loaded with the zeolite molecular sieve. Preferably, such a packed bed, preferably a packed column, loaded with the zeolite molecular sieve is installed in a production unit of the plant.

A packed (dehydration) column is very well suited to operate in large scale productions (i.e. for example in a production unit of a plant) to produce a dehydrated liquid mixture, preferably comprising water in an amount of less than 20 ppm and isopropyl alcohol to preferably in an amount of less than 25 ppm, based on the total amount of the dehydrated liquid mixture. A packed (dehydration) column, loaded with the zeolite molecular sieve (as described above, preferably zeolite molecular sieves as described as being preferred) can be replaced in one piece in order to only shortly interrupt the large scale production. While a first packed (dehydration) column is regenerated (recycled) a second column can be used to continue the large scale production. Furthermore, if a plant is used for large scale production two packed (dehydration) columns can be installed in parallel such that the process is preferably not interrupted at all.

Furthermore, in a packed bed (e.g. such as a column) the capacity of the zeolite molecular sieve material is optimally used due to the flow of the liquid starting mixture through the column containing the zeolite molecular sieve material (as described above, in particular binderless zeolite molecular sieves described as being preferred).

It is furthermore preferred that the steps c) and d) (preferably the contacting step d)) of the method according to the invention (as described above, in particular a method described as being preferred) are conducted at a pressure (within the production equipment) of maximum 50 bar, preferably in the range of from very close to zero to 50 bar, more preferably in the range of from 0.5 to 10 bar, most preferably in the range of from 1 to 1.5 bar, and/or preferably at a temperature in the range of from −20 to 100° C., more preferably at a temperature in the range of from −20 to 60° C., most preferably at a temperature in the range of from −20 to 40° C. If the liquid starting mixture solidifies at least partially in the temperature range of from −20° C. to 60° C. (preferably in the temperature range of from 20 to 60° C.), a method is preferred, conducted at a temperature in the range of from 0 to 30 Kelvin, preferably 0 to 20 Kelvin, above the corresponding solidification temperature of the liquid starting mixture.

As mentioned above, in a method according to the invention the liquid starting mixture comprises optionally further compounds. This means that optionally one, two, three or more than three further compounds are included in the liquid starting mixture. Preferably, one, more than one or all of these compounds are selected from the group consisting of biphenyl, cyclohexylbenzene, ethylene sulfide, methacrylic acid esters of C1 to C8 alcohols, partly- or perfluorinated methacrylic acid esters of C1 to C8 alcohols, acrylic acid esters of C1 to C8 alcohols, partly- or perfluorinated acrylic acid esters of C1 to C8 alcohols, boronic acid esters of C1 to C8 alcohols, partly- or perfluorinated boronic acid esters of C1 to C8 alcohols, boric acid esters of C1 to C8 alcohols, partly- or perfluorinated boric acid esters of C1 to C8 alcohols, partly- or perfluorinated acetic acid esters of C1 to C8 alcohols, partly- or perfluorinated butyric acid esters of C1 to C8 alcohols, di alkyl sulfides, carboxylic acid nitriles (preferably selected from the group consisting of acrylonitrile and succinonitrile), conducting salts and further additives (preferably selected from the group consisting of hydrofluoric acid, gamma-hydroxy propane sulfonic acid, 1-Methyl-gamma-hydroxy propane sulfonic acid, 1-Ethyl-gamma-hydroxy propane sulfonic acid, 1-Propyl-gamma-hydroxy propane sulfonic acid (1-Hydroxyethyl-1-butane sulfonic acid), 1-Butyl-gamma-hydroxy propane sulfonic acid (1-Hydroxyethyl-1-pentane sulfonic acid), 4-hydroxy-1-butane sulfonic acid, 1-Methyl-4-hydroxy-1-butane sulfonic acid, 1-Ethyl-4-hydroxy-1-butane sulfonic acid, 1-Octyl-4-hydroxy-1-butane sulfonic acid (1-Hydroxypropyl-1-nonane sulfonic acid), 5-hydroxy-1-pentane sulfonic acid, phosphoric acid, phosphorous acid, 1,3-propane sultone, 1-Methyl-1,3-propane sultone, 1-Ethyl-1,3-propane sultone, 1-Propyl-1,3-propane sultone, 1-Butyl-1,3-propane sultone, 1,4-butane sultone, 1-Methyl-1,4-butane sultone, 1-Ethyl-1,4-butane sultone, 1-Octyl-1,4-butane sultone, 1,5-pentane sultone, phosphoric acid esters of C1 to C8 alcohols, partly- or perfluorinated phosphoric acid esters of C1 to C8 alcohols, phosphorous acid esters of C1 to C8 alcohols and partly- or perfluorinated phosphorous acid esters of C1 to C8 alcohols). Preferably, the one, two, three or more than three optionally further compounds are selected from the group consisting of biphenyl, cyclohexylbenzene, acrylonitrile, methacrylic acid esters of C1 to C8 alcohols, partly- or perfluorinated methacrylic acid esters of C1 to C8 alcohols, acrylic acid esters of C1 to C8 alcohols and partly- or perfluorinated acrylic acid esters of C1 to C8 alcohols.

Preferred partly- or perfluorinated acetic acid esters of C1 to C8 alcohols are partly- or perfluorinated acetic acid methyl ester and partly- or perfluorinated acetic acid ethyl ester. Preferred partly- or perfluorinated butyric acid esters of C1 to C8 alcohols are partly- or perfluorinated butyric acid methyl ester and partly- or perfluorinated butyric acid ethyl ester. In case the liquid starting mixture comprises acetic acid esters of C1 to C8 alcohols and/or butyric acid esters of C1 to C8 alcohols (which are not counted among the optional further compounds) and additionally partly- or perfluorinated acetic acid esters of C1 to C8 alcohols and/or partly- or perfluorinated butyric acid esters of C1 to C8 alcohols (which are counted among the optional further compounds) the latter group of partly- or perfluorinated compounds is not counted among the total amount of 90% by weight or more, based on the total amount of the liquid starting mixture, of compounds as described above.

Preferably, no conducting salts are present in the liquid starting mixture.

Biphenyl is an additive used in order to reduce the flammability and/or to prevent overloading.

In the method according to the invention (as described above, in particular a method described as being preferred) the liquid starting mixture comprises a total amount of 90% by weight (or more), based on the total amount of the liquid starting mixture, of compounds selected from the group of organic carbonates, acetic acid esters of C1 to C8 alcohols and butyric acid esters of C1 to C8 alcohols, wherein the total amount of acetic acid esters of C1 to C8 alcohols and butyric acid esters of C1 to C8 alcohols is in the range of from 0 to 45% by weight, based on the total amount of the liquid starting mixture. This liquid starting mixture might comprise additionally 20 ppm water and 5 ppm isopropyl alcohol, based on the total amount of the liquid starting mixture. In the case the liquid starting mixture comprises 90% by weight of carbonates (optionally including acetic acid esters of C1 to C8 alcohols and butyric acid esters of C1 to C8 alcohols), 20 ppm (0.002% by weight) water and 5 ppm (0.0005% by weight) isopropyl alcohol, the total amount is 90.0025% by weight, based on the total amount of the liquid starting mixture. This means that the total amount of further compounds is 9.9975% by weight. However, preferred is a method according to the present invention (as described above, in particular a method described as being preferred), wherein the total amount of said optional further compounds in the liquid starting mixture is in the range of from 0 to 9.0% by weight, more preferably in the range of from 0 to 7% by weight, even more preferably in the range of from 0 to 5% by weight, further preferably in the range of from 0 to 3% by weight, based on the total amount of the liquid starting mixture.

In some cases it is preferred that the total amount of said optional further compounds in the liquid starting mixture is 0.1% by weight or less, more preferably no optional further compounds are present at all in the liquid starting mixture.

In the method according to the invention (as described above, in particular in a method described as being preferred) very low amounts of selected ions have been observed in the dehydrated mixture. Preferred is a method according to the invention, wherein in the dehydrated liquid mixture the concentration of each individual ion selected from the group consisting of sodium ions, aluminium ions, silicon ions, potassium ions and calcium ions is 5 ppm or less, preferably 3 ppm or less, more preferably 1 ppm or less, based on the total amount of the dehydrated liquid mixture.

If not indicated otherwise, in order to determine whether the concentration of a given ion is 5 ppm or less, is 3 ppm or less, or is even 1 ppm or less the ion concentration should be quantitatively determined by GC (gas chromatography) combined with ICP-MS (inductively coupled plasma mass spectrometry) measurements. The skilled person is aware of the practical requirements to be met in order to arrive at reliable results.

If the individual concentrations of the aforementioned ions are in the ranges as described above (in particular in the ranges described as being preferred) the life time (and thus the quality) of a corresponding lithium ion battery is usually prolonged.

A second aspect of the present invention relates to a (second) method of producing an electrolyte mixture comprising the following steps:
  producing a dehydrated liquid mixture according to a method of the present invention (a method according to the first aspect of the present invention as described above, in particular the method described as being preferred)
  mixing said dehydrated liquid mixture with one or more conducting salts.

Preferably, in this (second) method according to the invention the one or more conducting salts are selected from the group consisting of lithium perchlorate (LiClO$_4$), lithium tetrafluoroborate (LiBF$_4$), lithium trifluoro tris(pentafluoroethyl)phosphate (LiPF$_3$(C$_2$F$_5$)$_3$), lithium bis(trifluoromethanesulfonyl)imide (LiN(SO$_2$CF$_3$)$_2$), lithium bis(fluorosulfonyl)imide (LiN(SO$_2$F)$_2$), lithium difluorooxalatoborate (LiBF$_2$(C$_2$O$_4$)), lithium hexafluorophosphate (LiPF$_6$) and lithium bis(oxalato)borate (LiB(C$_2$O$_4$)$_2$). More preferably, the conducting salt is lithium hexafluorophosphate (LiPF$_6$), lithium trifluoro tris-(pentafluoroethyl)phosphate (LiPF$_3$(C$_2$F$_5$)$_3$) and lithium bis(fluorosulfonyl)imide (LiN(SO$_2$F)$_2$).

Furthermore preferred is a method according to this second aspect of the present invention (as described before), wherein optionally additional ingredients are mixed with the dehydrated liquid mixture (i.e. mixed with a dehydrated liquid mixture already comprising one or more than one conducting salts). Such additional ingredients are one, two, three or more than three compounds preferably selected from the group consisting of vinylene carbonate, vinyl ethylene carbonate, cyclohexylbenzene, succinic anhydride, ethenyl sulfonyl benzene, ethyl acetate and exo vinylene carbonates, preferably exo vinylene carbonates selected from the group consisting of 4,4-dimethyl-5-methylene-1,3-dioxolan-2-one, 4-methyl-5-methylene-1,3-dioxolan-2-one and 4-methylene-1,3-dioxolan-2-one.

The aforementioned additional ingredients usually improve (i.e. prolong) the battery life span. For more details reference is made for example to EP 1 83674681 B1, paragraph [0024].

The conducting salts as well as the additional ingredients are preferably in dry conditions (e.g. their total amount of water is preferably less than 20 ppm) before mixing them with the dehydrated liquid mixture (as described above, in particular a dehydrated liquid mixture described as being preferred).

As mentioned above, the method according to the first aspect of the present invention (production of a dehydrated liquid mixture) is preferably conducted in a production unit of a plant. It is also preferred that the method according to the second aspect of the present invention (production of an electrolyte mixture) is conducted in a production unit of a plant, preferably in the same production unit.

An example of such a production unit is shown below in FIG. 4.

The first aspect of the present invention (method for producing a dehydrated liquid mixture) is additionally described below by reference to the appended FIGS. 1 to 3:

Figure 4:
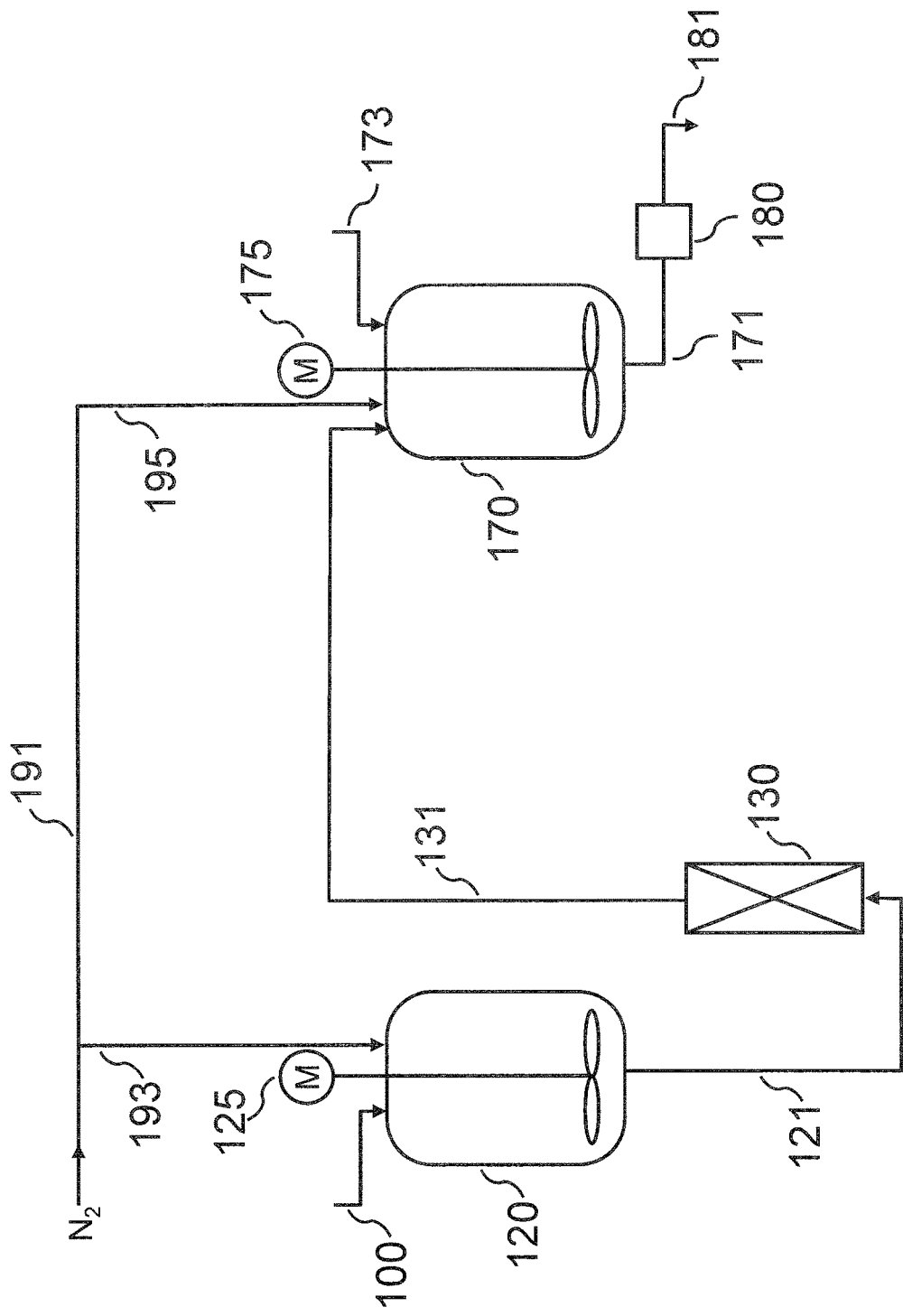

FIG. 4 diagrammatically shows a production unit for producing an electrolyte mixture, according to the second aspect of the present invention (method for producing an electrolyte mixture).

Figure 1:
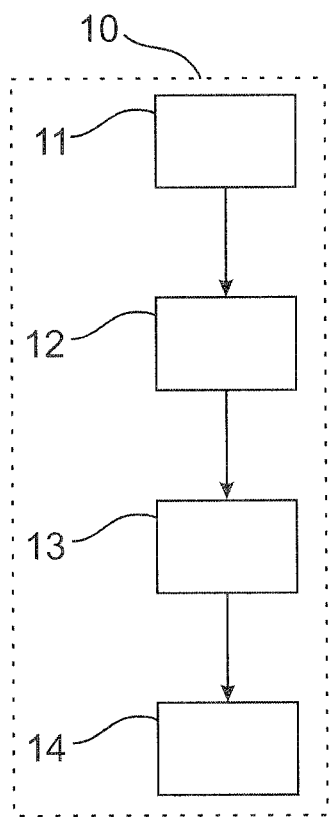
FIG. 1 shows an illustrative flow diagram illustrating the method according to the present invention for producing a dehydrated liquid mixture in the interior of the production equipment for use as a solvent for a conducting salt.

FIG. 1 shows an illustrative flow diagram 10 of the method according to the present invention. In flow diagram 10 four different basic steps (steps 11 to 14) are depicted.

As a first basic step 11 a cleaning step a) is conducted (i.e. cleaning of the interior of the production equipment with isopropyl alcohol). After said first basic step 11 a second basic to step 12 is conducted which represents removing step b) of the method of the present invention, wherein the contaminating substances are removed from the interior of the production equipment after said cleaning with isopropyl alcohol, so that the isopropyl alcohol content in the interior of the production equipment is reduced. After said second basic step 12 a third basic step 13 is conducted which represents step c) of the method of the present invention (i.e. providing or preparing a liquid starting mixture in said interior of the production equipment after said removal of contaminating substances, wherein the liquid starting mixture in said interior of the production equipment comprises
    a total amount of 90% by weight or more, based on the total amount of the liquid starting mixture, of compounds selected from the group of organic carbonates, acetic acid esters of C1 to C8 alcohols and butyric acid esters of C1 to C8 alcohols, wherein the total amount of acetic acid esters of C1 to C8 alcohols and butyric acid esters of C1 to C8 alcohols is in the range of from 0 to 45% by weight, based on the total amount of the liquid starting mixture,
    water in a total amount of 3500 ppm to 20 ppm, based on the total amount of the liquid starting mixture,
    isopropyl alcohol in a total amount of 100 ppm to 5 ppm, based on the total amount of the liquid starting mixture,
    optionally further compounds).

After said basic step 13 a fourth basic step 14 is conducted which represents contacting step d) of the method of the present invention (i.e. contacting the liquid starting mixture resulting after step c) with an amount of a zeolite molecular sieve such that both the isopropyl alcohol content in the mixture and the water content in the mixture is reduced by interaction with said zeolite molecular sieve).

Figure 2:
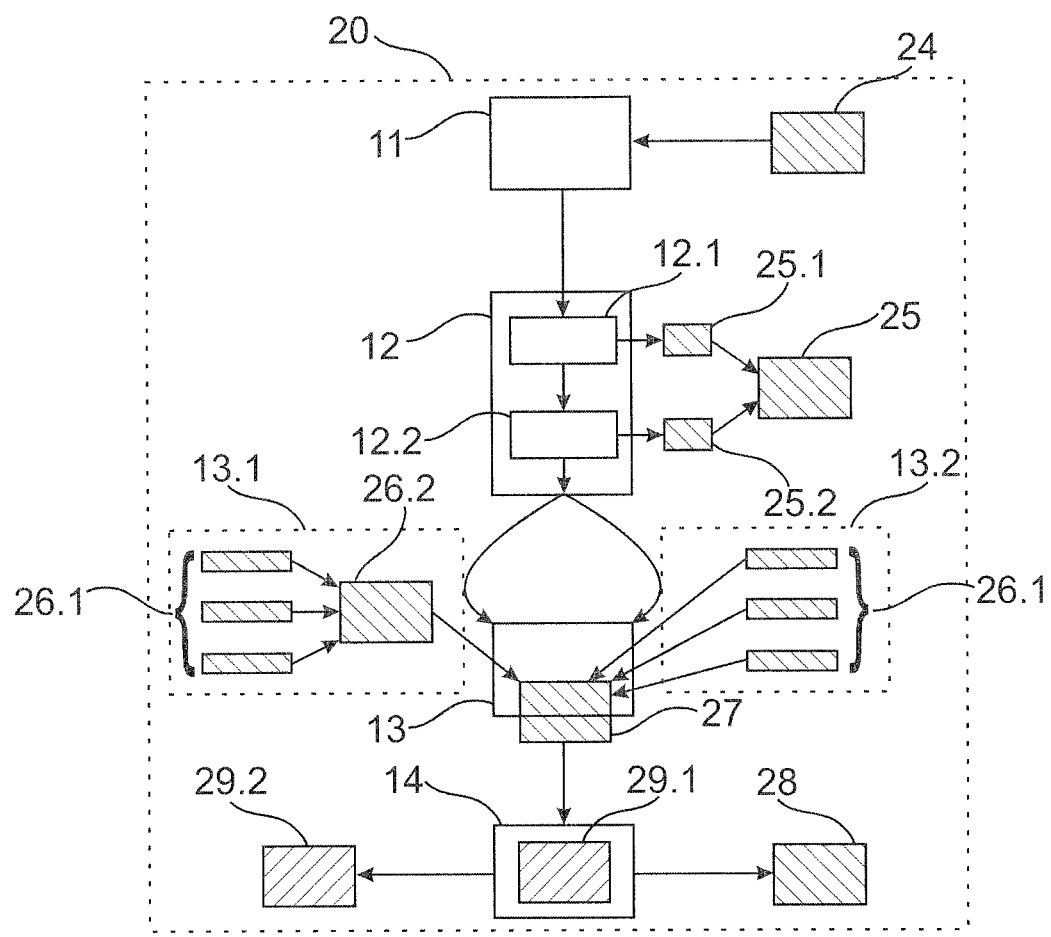
FIG. 2 shows a more detailed flow diagram illustrating the method according to the present invention.

FIG. 2 shows a more detailed flow diagram 20 illustrating the method according to the present invention and referring to the four basic steps 11 to 14 depicted in FIG. 1. In addition, compounds and mixtures 24, 25, 25.1, 25.2, 26.1, 26.2, 27 and 28 as well as a material 29.1 and a material 29.2 and the individual steps 12.1, 12.2, 13.1 and 13.2 are depicted. In FIG. 2 method steps are depicted in transparent boxes whereas a compound (also a mixture) and a material are depicted in boxes having different diagonal lines.

Prior to basic step 11, isopropyl alcohol 24 is introduced into the interior of the production equipment. In basic step 11 said interior is cleaned by contacting the inner surfaces of the interior of the production equipment with isopropyl alcohol, preferably by rinsing or flushing said inner surfaces with isopropyl alcohol (in some cases while the inner surfaces of the interior of the production equipment are heated). After basic step 11 is conducted the resulting contaminating substances 25 (which are or mostly comprise isopropyl alcohol) are removed from the interior of the production equipment in basic step 12. This removal in basic step 12 typically comprises consecutive individual steps. A first individual step 12.1 is conducted including one or more than one steps selected from the group of steps consisting of (actively) pumping or sucking out said contaminating substances and (passively) allow for running off (draining) said contaminating substances in order to remove the major volume 25.1 of the contaminating substances. After individual step 12.1, a second individual step 12.2 is carried out in order to remove remaining amounts 25.2 of contaminating substances, wherein individual step 12.2 comprises one or more steps selected from the group of steps consisting of vacuum evaporation at a pressure in the range of from 0.01 mbar to 850 mbar (preferably in the range of from 0.1 mbar to 500 mbar, more preferably in the range of from 1 mbar to 100 mbar) and purging the interior of the production equipment with a purge gas, preferably nitrogen gas, wherein preferably the nitrogen gas has a temperature in the range of from 273.15 Kelvin to 473.15 Kelvin (more preferably in the range of from 293.15 Kelvin to 373.15 Kelvin). Alternatively, dry air can be used instead of nitrogen gas, preferably at a temperature in the range of from 273.15 Kelvin to 473.15 Kelvin. After basic step 12, almost no contaminating substances are present in the interior of the production equipment and basic step 13 is conducted, either by means of alternative step 13.1 (left hand arrow) or alternative step 13.2 (right hand arrow).

According to alternative step 13.1 the major compounds 26.1 of the liquid starting mixture (i.e. organic carbonates, optional acetic acid esters of C1 to C8 alcohols, optional butyric acid esters of C1 to C8 alcohols, and optional further compounds; typically accompanied by trace amounts of water) are provided as a pre-starting mixture 26.2 (typically also including trace amounts of water), wherein this pre-starting mixture 26.2 is introduced into the interior of the production equipment, thus providing a liquid starting mixture 27 in the interior of the production equipment.

According to alternative step 13.2 the major compounds 26.1 of the liquid starting mixture are mixed with each other within the interior of the production equipment such that the liquid starting mixture 27 results in the interior of the production equipment, thus preparing a liquid starting mixture in the interior of the production equipment.

The result of basic step 13 is a liquid starting mixture 27 which comprises
- a total amount of 90% by weight or more, based on the total amount of the liquid starting mixture, of compounds selected from the group of organic carbonates, acetic acid esters of C1 to C8 alcohols and butyric acid esters of C1 to C8 alcohols, wherein the total amount of acetic acid esters of C1 to C8 alcohols and butyric acid esters of C1 to C8 alcohols is in the range of from 0 to 45% by weight, based on the total amount of the liquid starting mixture,
- water in a total amount of 3500 ppm to 20 ppm, based on the total amount of the liquid starting mixture,
- isopropyl alcohol in a total amount of 100 ppm to 5 ppm, based on the total amount of the liquid starting mixture,
- optionally further compounds.

Thus, liquid starting mixture 27 is a result after the (mixed) major compounds 26.1 of the liquid starting mixture were in contact with the inner surfaces of the interior of the production equipment.

After basic step 13, basic step 14 is conducted, i.e. the liquid starting mixture 27 being the result of basic step 13 is contacted with an amount of a zeolite molecular sieve 29.1 such that both the isopropyl alcohol content in the mixture and the water content in the mixture is reduced by interaction with said zeolite molecular sieve. In FIG. 2 the same zeolite molecular sieve is depicted in two different states (29.1 and 29.2): the zeolite molecular sieve material 29.1 represents the sieve material prior to the interaction with the liquid starting mixture 27, whereas the zeolite molecular sieve material 29.2 depicts the state after the zeolite molecular sieve material has interacted with the liquid starting mixture 27 in order to produce a dehydrated liquid mixture 28. This means that the zeolite molecular sieve material 29.1 represents a material providing a higher loading capacity for water molecules and isopropyl alcohol molecules compared to the loading capacity of the zeolite molecular sieve material 29.2, representing a material which is loaded with water molecules and isopropyl alcohol molecules through interaction with the liquid starting mixture 27. The result of basic step 14 is (i.e. as a result of said interaction) the dehydrated liquid mixture 28, which has a reduced water content (preferably providing a water content of less than 20 ppm, based on the total amount of the dehydrated liquid mixture) and a reduced isopropyl alcohol content (preferably the isopropyl alcohol content is less than 25 ppm, more preferably less than 5 ppm, based on the total amount of the dehydrated liquid mixture).

Figure 3:
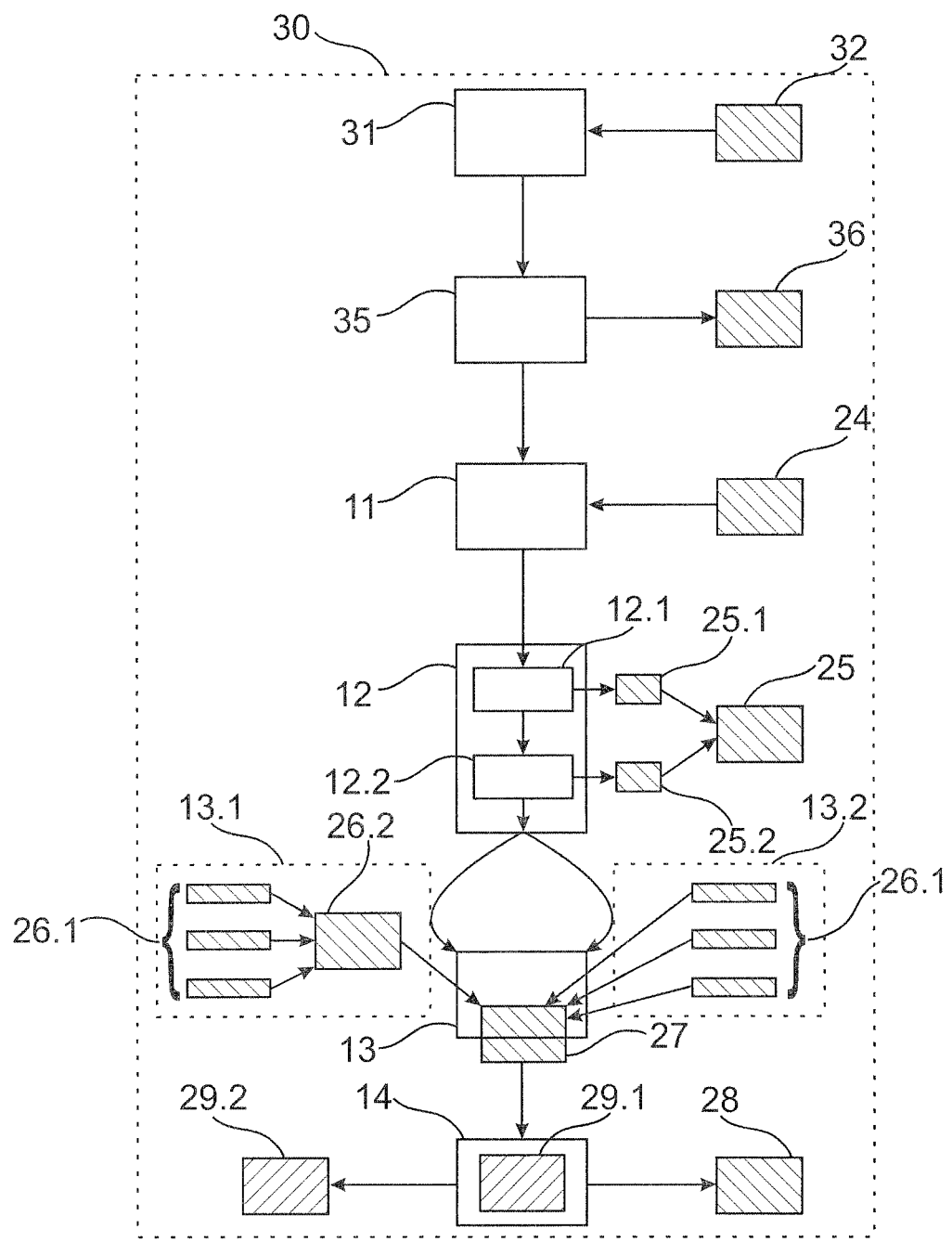
FIG. 3 shows an even more detailed flow diagram illustrating the method according to the present invention.

FIG. 3 shows an even more detailed flow diagram 30 illustrating the method according to the present invention. The flow diagram in FIG. 3 is identical with the flow diagram shown in FIG. 2 with the only difference that in flow diagram 30 the additional steps 31 and 35 are depicted as well as an additional compound 32 and an additional mixture 36.

Prior to additional step 31, (chemically clean) water 32 is introduced into the interior of the production equipment. In step 31 said interior is cleaned by contacting the inner surfaces of the interior of the production equipment, preferably by rinsing or flushing said inner surfaces with the water (a boiling out with water is less preferred). After cleaning step 31 is conducted, the resulting water 36 (which is or mostly comprises water) is removed from the interior of the production equipment in removing step 35. This removal comprises one or more than one further individual steps selected from the group of steps consisting of (actively) pumping or sucking out said resulting water, (passively) allow for running off (draining) said resulting water, vacuum evaporation at a pressure in the range of from 0.01 mbar to 850 mbar (preferably in the range of from 0.1 mbar to 500 mbar, more preferably in the range of from 1 mbar to 100 mbar) and purging the interior of the production equipment with a purge gas, preferably nitrogen gas, wherein preferably the nitrogen gas has a temperature in the range of from 273.15 Kelvin to 473.15 Kelvin (preferably in the range of from 293.15 Kelvin to 373.15 Kelvin). After removing step 35 the method continues as described above with reference to FIG. 2.

FIG. 4 diagrammatically shows a production unit for producing an electrolyte mixture, comprising a feed line 100 connected with a first mixing unit 120. The first mixing unit 120 comprises a first agitator 125 for a first mixing process. The first mixing unit 120 is connected by means of duct 121 with a dehydration unit 130 comprising a packed bed of a dehydration column loaded with shaped bodies of zeolite molecular sieve material. The outlet side of the dehydration unit 130 is connected by means of duct 131 with a second mixing unit 170, connected to a feed line 173 (for providing a feed of one or more conducting salts and optionally additional ingredients) and comprising a second agitator 175 for a second mixing process. The outlet of the second mixing unit 170 is connected with a to filter unit 180 by means of duct 171. Connected with the outlet side of the filter unit 180 is an effluent duct 181 for product withdrawal.

A nitrogen feed line 191 is connected with the first and second mixing unit 120 and 170, respectively, via two individual transfer ducts 193 and 195, respectively, in order to ventilate said mixing units with nitrogen gas while the mixing units are filled or emptied.

For conducting a method according to the second aspect of the present invention the interior of the production equipment as described with reference to FIG. 4 is cleaned as described in the method of the present invention (according to the first aspect). This means that after all cleaning steps the liquid starting mixture is either filled into or produced (preferably produced) in the first mixing unit 120 by means of feed line 100. With mixing by first agitator 125 the compounds of the liquid starting mixture are mixed in the first mixing unit 120 (in particular in order to produce the liquid starting mixture according to step c). The resulting liquid starting mixture is transferred by means of duct 121 into dehydration unit 130. In the dehydration unit 130 the liquid starting mixture is contacted with the zeolite molecular sieve material such that the water content and the isopropyl alcohol content in said liquid starting mixture is reduced, preferably the water content is reduced to an amount of less than 20 ppm, and, preferably, the isopropyl alcohol content is reduced to an amount of less than 25 ppm, more preferably to less than 5 ppm. After the reduction of the water and isopropyl alcohol content in dehydration unit 130 a dehydrated liquid mixture is produced. The dehydrated liquid mixture is transferred into the second mixing unit 170 by means of duct 131. Into the second mixing unit 170 additionally one or more conducting salts and optionally additional ingredients are added by means of feed line 173 and mixed with the dehydrated liquid mixture by second agitator 175 to produce an electrolyte mixture. The electrolyte mixture produced in the second mixing unit 170 is transported to the filter unit 180 by means of duct 171. After filtration of the electrolyte mixture in filter unit 180 (in order to remove abrasion products of the zeolite molecular sieve material and other dust particles from the raw materials and/or from the dehydration process) the filtered electrolyte mixture is withdrawn from the process by the effluent duct 181.

The present invention is furthermore described below in more detail by reference to Examples.

EXAMPLES

1. Sample Preparation

An experimental liquid starting mixture (experimental mixture I) consisting of dimethyl carbonate, $H_2O$ (229 ppm, based on the total amount of the experimental liquid starting to mixture) and isopropyl alcohol (60 ppm, based on the total amount of the experimental liquid starting mixture), was prepared. Thus, experimental mixture I comprises one organic carbonate in a total amount of 90% by weight or more, based on the total amount of the liquid starting mixture.

Experimental mixture I was subsequently split into 6 portions each providing 50 ml resulting in 6 experimental sample mixtures (S1 to S6).

2. Sample Treatment

Experimental sample mixtures S1 and S2 were treated with a zeolite molecular sieve of Linde Typ 13X, whereas experimental sample mixtures S3 and S4 were treated with binderless zeolite molecular sieves of Linde Typ 4A, experimental sample mixtures S5 and S6 with binder-containing zeolite molecular sieves of Linde Typ 4A, respectively. Prior to treatment, each experimental sample mixture and a weighed amount of zeolite molecular sieve material was filled and mixed in respective flasks (made of glass) which were shaken in a shaking cabinet during one night for 20 hours at 25° C. Each respective zeolite molecular sieve material was predried at 200° C. in a vacuum oven (10 mbar) overnight prior to usage. The shaking cabinet was purged with nitrogen during each experiment and each flask had a glued septum in its cap.

For the determination of the water content, a sample of the supernatant was taken with a syringe through the septum of each flask. Analysis was carried out by coulometric Karl-Fischer titration. The amount of isopropyl alcohol was determined by Headspace gas chromatography. Prior to use, syringes were predried in a desiccator for at least 48 h.

The compositions of each experimental sample mixture S1 to S6 is shown in Table 1. The following abbreviations are used:
DMC: dimethyl carbonate
MS 13X: zeolite molecular sieve 13X
MS 4A BF: binderless zeolite molecular sieve 4A
MS 4A: binder-containing zeolite molecular sieve 4A

TABLE 1

|  | S1 | S2 | S3 | S4 | S5 | S6 |
| --- | --- | --- | --- | --- | --- | --- |
| DMC [ml] | 50 | 50 | 50 | 50 | 50 | 50 |
| MS 13X [g] | 2.034 | 5.053 | — | — | — | — |
| MS 4A BF [g] | — | — | 2.077 | 5.039 | — | — |
| MS 4A [g] | — | — | — | — | 2.023 | 5.053 |

3. Treatment Results

Table 2 shows the amount of water and the amount of isopropyl alcohol after 20 hours of sample treatment.

TABLE 2

|  | S1 | S2 | S3 | S4 | S5 | S6 |
| --- | --- | --- | --- | --- | --- | --- |
| $H_2O$ [ppm] | 17.7 | 17.8 | 3.6 | 2.3 | 3.8 | 3.9 |
| isopropyl alcohol [ppm] | 50 | 40 | 30 | <5 | 15 | <5 |

The water content after 20 hours of sample treatment was determined twice for each sample. In Table 2 the average values are shown.

As shown in Table 2 in each sample S1 to S6 the water content was reduced compared to the water content in each respective sample prior to the treatment. In each sample the water content was reduced even to an amount below 20 ppm, based on the total amount of each respective experimental sample mixture. In addition, the amount of isopropyl alcohol was simultaneously reduced in each sample (also compared to each respective to sample prior to the treatment). In samples S4, S5 and S6 the amount of isopropyl alcohol was even reduced to an amount of less than 25 ppm, based on the total amount of each respective experimental sample mixture.

The invention claimed is:

1. A method for producing in an interior of production equipment, a dehydrated liquid mixture, the method comprising:
   a) cleaning the interior of the production equipment with isopropyl alcohol,
   b) removing contaminating substances from the interior of the production equipment after step a so that the isopropyl alcohol content in the interior of the production equipment is reduced,
   c) providing a liquid starting mixture in the interior of the production equipment after step (b), wherein the liquid starting mixture comprises:
   a total amount of 90% by weight or more, based on the total amount of the liquid starting mixture, of at least one compound selected from the group consisting of an organic carbonate, an acetic acid ester of a C1 to C8 alcohol, and a butyric acid ester of a C1 to C8 alcohol, wherein the total amount of the acetic acid ester of the C1 to C8 alcohol and the butyric acid ester of the C1 to C8 alcohol ranges from 0% to 45% by weight, based on the total amount of the liquid starting mixture,
   water in a total amount of 3500 ppm to 20 ppm, based on the total amount of the liquid starting mixture, and
   isopropyl alcohol in a total amount of 100 ppm to 5 ppm, based on the total amount of the liquid starting mixture, and
   d) contacting the liquid starting mixture provided in step c) with an amount of a zeolite molecular sieve such that both the isopropyl alcohol content and the water content in the mixture are reduced by interaction with the zeolite molecular sieve, thereby obtaining a dehydrated liquid mixture.

2. The method according to claim 1, wherein said zeolite molecular sieve is a binderless zeolite molecular sieve or a binder-containing zeolite molecular sieve.

3. The method according to claim 1, further comprising prior to step a):
(i) cleaning the interior of the production equipment with water and
(ii) reducing the water content in the interior of the production equipment.

4. The method according to claim 1, wherein cleaning in step a) is carried out by flushing or rinsing the interior of the production equipment.

5. The method according to claim 1, wherein the contaminating substances comprise one or more compounds selected from the group consisting of water, an alcohol, toluene and acetone.

6. The method according to claim 1, wherein step b) comprises removing the contaminating substances from the interior of the production equipment by vacuum evaporation at a pressure ranging from 0.01 mbar to 850 mbar.

7. The method according to claim 1, wherein step b) comprises purging the interior of the production equipment with a purge gas.

8. The method according to claim 1, wherein the total amount of water in the liquid starting mixture ranges from 3000 ppm to 20 ppm.

9. The method according to claim 1, wherein in step d) the water content in the mixture is reduced to less than 20 ppm, based on a total amount of the dehydrated liquid mixture.

10. The method according to claim 1, wherein the at least one compound in the liquid starting mixture is the organic carbonate of Formula (I)

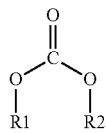

(I)

wherein R1 and R2 independently are an alkyl group of one or more carbon atoms,
or
R1 and R2 together form a substituted or unsubstituted alkylene bridge linking the oxygen atoms.

11. The method according to claim 1, wherein the liquid starting mixture in the interior of the production equipment comprises
isopropyl alcohol in a total amount of 100 ppm to 25 ppm, and
wherein in step d) the isopropyl alcohol content in the mixture is less than 25 ppm, based on the total amount of the dehydrated liquid mixture.

12. The method according to claim 1, wherein the zeolite molecular sieve comprises a shaped body.

13. The method according to claim 1, wherein the zeolite molecular sieve is a packed bed loaded with the zeolite molecular sieve.

14. The method according to claim 1, wherein the concentration of sodium ion, potassium ion, silicon ion, aluminum ion or calcium ion are all 5 ppm or less, based on a total amount of the dehydrated liquid mixture.

15. The method according to claim 1, wherein the total amount of water in the liquid starting mixture ranges from 2000 ppm to 20 ppm, based on the total amount of the liquid starting mixture.

16. The method according to claim 1, wherein the total amount of water in the liquid starting mixture ranges from 1000 ppm to 20 ppm, based on the total amount of the liquid starting mixture.

17. The method according to claim 1, wherein the total amount of water in the liquid starting mixture ranges 500 ppm to 20 ppm, based on the total amount of the liquid starting mixture.

18. The method according to claim 1, wherein the total amount of water in the liquid starting mixture ranges from 400 ppm to 20 ppm, based on the total amount of the liquid starting mixture.

19. The method according to claim 1, wherein the total amount of water in the liquid starting mixture ranges from 300 ppm to 20 ppm, based on the total amount of the liquid starting mixture.

20. The method according to claim 1, wherein the total amount of water in the liquid starting mixture ranges from 200 ppm to 20 ppm, based on the total amount of the liquid starting mixture.

21. The method according to claim 1, wherein the total amount of water in the liquid starting mixture ranges from 150 ppm to 20 ppm, based on the total amount of the liquid starting mixture.

* * * * *